(12) United States Patent  
McCartney

(10) Patent No.: US 10,460,340 B2  
(45) Date of Patent: Oct. 29, 2019

(54) VERIFYING AD REQUESTS

(71) Applicant: WideOrbit Inc., San Francisco, CA (US)

(72) Inventor: Steve McCartney, Lightwater (GB)

(73) Assignee: WIDEORBIT INC., San Francisco, CA (US)

( * ) Notice: Subject to any disclaimer, the term of this patent is extended or adjusted under 35 U.S.C. 154(b) by 1028 days.

(21) Appl. No.: 14/814,963

(22) Filed: Jul. 31, 2015

(65) Prior Publication Data

US 2017/0032413 A1 Feb. 2, 2017

(51) Int. Cl.
  *G06Q 30/02* (2012.01)
  *H04L 29/06* (2006.01)
  *G06F 21/64* (2013.01)
  *H04L 9/14* (2006.01)
  *H04L 9/32* (2006.01)

(52) U.S. Cl.
  CPC ......... *G06Q 30/0248* (2013.01); *G06F 21/64* (2013.01); *G06Q 30/0241* (2013.01); *G06Q 30/0275* (2013.01); *H04L 9/14* (2013.01); *H04L 9/3247* (2013.01); *H04L 9/3297* (2013.01); *H04L 63/123* (2013.01)

(58) Field of Classification Search
  CPC ...................................................... G06Q 30/02
  See application file for complete search history.

(56) References Cited

U.S. PATENT DOCUMENTS

| | | | | |
|---|---|---|---|---|
| 6,341,349 B1* | 1/2002 | Takaragi | ............... | H04L 9/3013 380/28 |
| 7,630,920 B2* | 12/2009 | Ishisaka | ............... | G06Q 30/08 705/1.1 |
| 2003/0005305 A1* | 1/2003 | Brickell | ............... | H04L 9/3247 713/177 |
| 2003/0093678 A1 | 5/2003 | Bowe et al. | | |
| 2005/0033641 A1 | 2/2005 | Jha et al. | | |
| 2007/0074027 A1* | 3/2007 | Tung | ............... | H04L 9/3247 713/176 |

(Continued)

FOREIGN PATENT DOCUMENTS

WO 2014/110536 A1 7/2014

OTHER PUBLICATIONS

Infosys technologies ltd.; researchers submit patent application, "detecting code injections through cryptographic methods", for approval. (Oct. 25, 2012). Computer Weekly News Retrieved from https://dialog.proquest.com (Year: 2012).*

(Continued)

*Primary Examiner* — Eric R Netzloff  
*Assistant Examiner* — Michael R Stibley  
(74) *Attorney, Agent, or Firm* — Seed IP Law Group LLP

(57) ABSTRACT

A method for verifying an ad request includes verifying a signature including the ad request using symmetric or asymmetric keys. Using symmetric keys, after an ad request having a first signature is received, a signature generation algorithm is executed to generate a second signature. If the first signature matches the second signature, then the ad request is determined to be verified. Using asymmetric keys, after an ad request having a signature is received, a signature verification algorithm is executed to determine if the signature matches the ad request. If so, then the ad request is determined to be verified.

20 Claims, 5 Drawing Sheets

(56) References Cited

U.S. PATENT DOCUMENTS

| | | | | | |
|---|---|---|---|---|---|
| 2011/0113252 | A1* | 5/2011 | Krischer | ............ | H04L 63/0823 |
| | | | | | 713/175 |
| 2012/0265609 | A1* | 10/2012 | Robert | ................ | G06Q 30/0257 |
| | | | | | 705/14.49 |
| 2013/0055384 | A1* | 2/2013 | Shulman | ............. | H04L 63/1425 |
| | | | | | 726/22 |
| 2014/0136342 | A1* | 5/2014 | Ringdahl | ........... | G06Q 30/0275 |
| | | | | | 705/14.71 |
| 2014/0180835 | A1* | 6/2014 | Bitran | ................ | G06Q 30/0241 |
| | | | | | 705/14.73 |
| 2014/0200971 | A1* | 7/2014 | Raichelgauz | .......... | H04H 60/31 |
| | | | | | 705/14.6 |
| 2016/0117732 | A1* | 4/2016 | Zou | .................... | G06Q 30/0261 |
| | | | | | 705/14.54 |
| 2016/0285861 | A1* | 9/2016 | Chester | .................... | H04L 9/14 |

OTHER PUBLICATIONS

Bernstein et al., "High-speed high-security signatures," Journal of Cryptographic Engineering 2 (2012), p. 77-89: http://ed25519.crypto/ed25519-20110926.pdf.

"Ed25519: high-speed high-security signatures," at http://ed25519.crypto/index.html (Sep. 27, 2011), 3 pages.

Anonymous: 11 Cryptographic nonce—Wikipedia, the free encyclopedia, Jul. 27, 2015 (Jul. 27, 2015), XP055290118, Retrieved from the Internet: URL:https://en.wikipedia.org/w/index.php?title=Cryptographic nonce&oldid= 673303095 [retrieved on Jul. 20, 2016??].

Anonymous: "Replay attack—Wikipedia, the free encyclopedia", Jun. 16, 2015 (Jun. 16, 2015), XP055290120, Retrieved from the Internet: URL:https://en.wikipedia.org/w/index.php?title=Replay attack &oldid=667255355 [retrieved on Jul. 20, 2016].

Anonymous: "Public-key cryptography—Wikipedia, the free encyclopedia", Jul. 5, 2015 (Jul. 5, 2015), XP055290124, Retrieved from the Internet: URL:https://en.wikipedia.org/w/index.php?title=Public-key cryptography&oldid=670016308 [retrieved on Jul. 20, 2016].

Anonymous: "Digital signature—Wikipedia, the free encyclopedia", Jul. 27, 2015 (Jul. 27, 2015), XP055290122, Retrieved from the Internet: URL:https://en.wikipedia.org/w/index.php?title=Digital_signature&oldid=673298961 [retrieved on Jul. 20, 2016].

\* cited by examiner

VERIFYING AD REQUESTS

TECHNICAL FIELD

The present disclosure relates to processing ad requests. In particular, the present disclosure relates to verifying ad requests.

BACKGROUND

In recent years, ad exchanges are becoming increasingly prevalent for facilitating the sale and purchase of online advertising. Often, the sale and purchase of online advertising is conducted through real-time bidding (RTB). Using RTB, advertising inventory is bought and sold on a per-impression basis, via programmatic instantaneous auction. An ad impression is a placement of an advertisement on a piece of web content, such as a webpage. Each time an ad is fetched on a loading of a piece of web content is counted as an ad impression.

When a publisher receives a request to load web content including an ad space, the publisher transmits an ad request for the ad impression to an ad exchange. The ad exchange transmits the ad request to advertisers. An advertiser may bid on the ad impression, and if the bid is won, the advertiser's advertisement is displayed with the web content. In some cases, a Demand Side Platform (DSP), a Supply Side Platform (SSP), an ad network, and/or other entities may also be involved in real-time transactions for the sale of ad impressions.

Various types of ad fraud may be committed in the various stages of real-time transactions for the sale of ad impressions. Fraud may lead to a distrust of ad exchanges as well as other entities involved in real-time transactions for the sale of ad impressions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
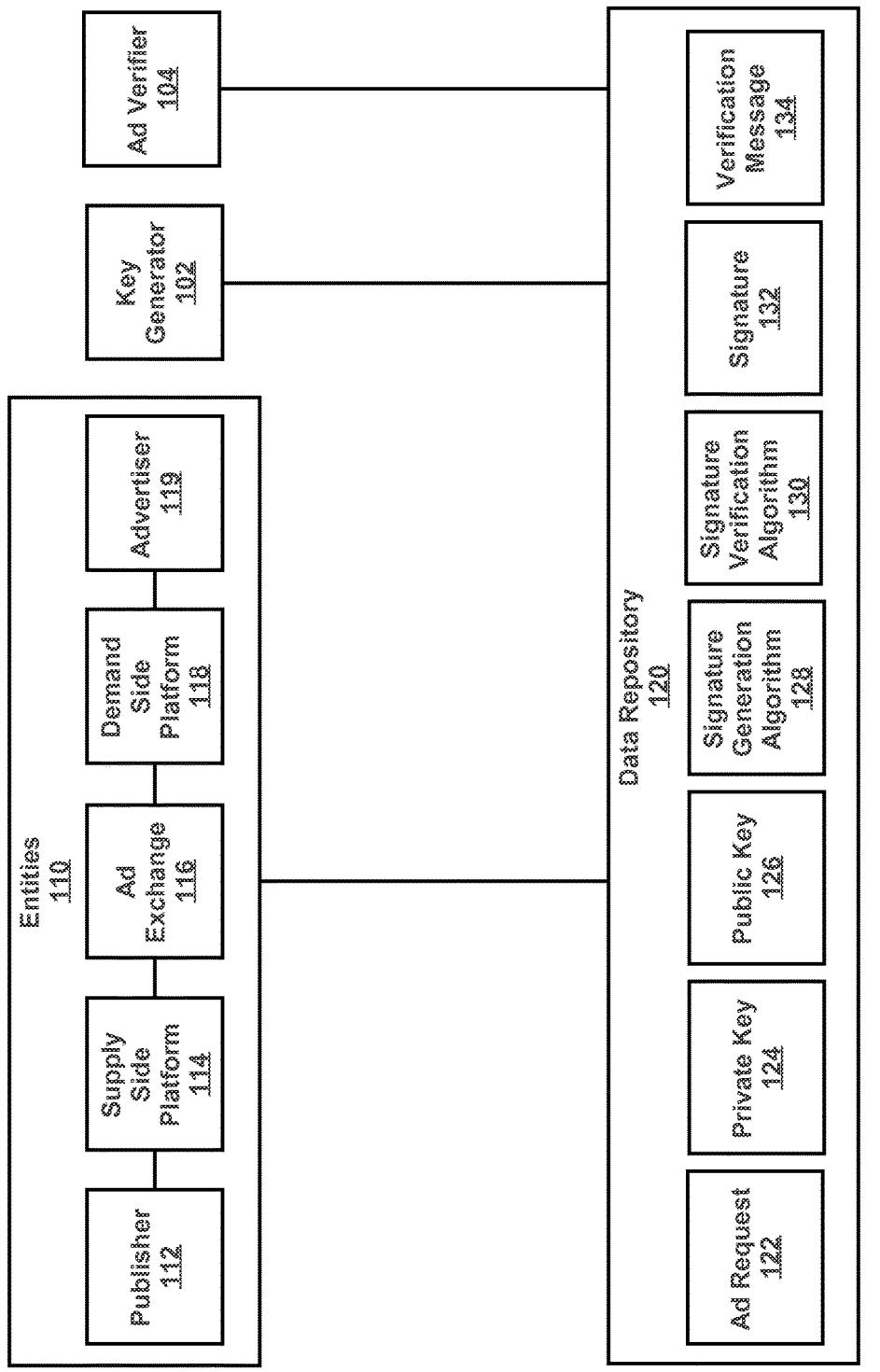
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

In one or more embodiments, a signed ad request is used to reduce the possibility of certain types of ad fraud. A signed ad request is generated by a publisher. The publisher generates a signature for an ad request by executing a signature generation algorithm. The signature is generated using a private key corresponding to the publisher. The publisher then adds the signature to the ad request, and transmits the ad request with the signature to a downstream entity involved in real-time transactions for the sale of ad impressions, such as a Supply Side Platform (SSP).

In one or more embodiments, a signed ad request is verified using symmetric keys. Verification using symmetric keys may be performed by an entity involved in real-time transactions for the sale of ad impressions, or by a third party, such as a neutral arbitrator. In an example, this verification is performed by an entity involved in real-time transactions for the sale of ad impressions, such as a SSP entity. The SSP entity holds a copy of a private key corresponding to a publisher. When the SSP entity receives a signed ad request corresponding to the publisher, the ad request executes a signature generation algorithm using the private key to generate another signature. If the signature, generated by the SSP entity matches the signature included in the ad request, then the ad request is verified. The SSP entity may then forward the ad request as a verified ad request to a downstream entity involved in real-time transactions for the sale of ad impressions, such as a Demand Side Platform (DSP) or an advertiser. Verification may also be performed by an ad exchange entity, an ad network entity, or a DSP entity prior to forwarding the verified ad request downstream to the advertiser or any intermediate entity between the verifying entity and the advertiser.

In another example, verification using symmetric keys is performed by a third party that holds a copy of a private key corresponding to a publisher. The verification performed by the third party is initiated by a verification request from an entity involved in real-time transactions for the sale of ad impressions, such as an ad exchange. When an ad exchange receives a signed ad request corresponding to the publisher, the ad exchange forwards the signed ad request to the third party with a verification request. The third party executes a signature generation algorithm using the private key to generate another signature. If this signature matches the signature included in the ad request, then the ad request is verified. The third party may then return a verification message to the ad exchange.

In one or more embodiments, a signed ad request is verified using asymmetric keys. Verification using asymmetric keys may be performed by an entity involved in real-time transactions for the sale of ad impressions, such as an ad exchange entity. In an example, an ad exchange entity receives a copy of a public key corresponding to a publisher. When the ad exchange entity receives a signed ad request corresponding to the publisher, the ad exchange entity executes a signature verification algorithm using the public key to determine if the signature in the signed ad request matches the ad request. If the signature matches the ad request, then the ad request is verified. The ad exchange entity may then forward the ad request as a verified ad request to other entities, such as a DSP or an advertiser.

B. Architectural Overview

FIG. 1 illustrates an example of a system in accordance with one or more embodiments. As illustrated in FIG. 1, system 100 includes the following components: a key generator 102, an ad verifier 104, and a data repository 120. In one or more embodiments, system 100 may include more or fewer components, than those illustrated in FIG. 1. Components in system 100 may be local to or remote from each other. Components in system 100 may be implemented in software and/or hardware and may be distributed over one or more applications and/or machines. In an embodiment, components within system 100 (for example, ad verifier 104 and data repository 120) are implemented on a same device. In another embodiment, components within system 100 are implemented on different devices. As illustrated in FIG. 1, system 100 further includes entities 110, which include entities involved in real-time transactions for the sale of ad impressions. In one or more embodiments, system 100 may include more or fewer entities 110, than those illustrated in FIG. 1. Operations described with respect to one component or entity may instead by performed by another component or entity.

In one or more embodiments, data repository 120 is any type of storage unit and/or device (e.g., a file system, database, collection of tables, or any other storage mechanism) for storing data. Data repository 120 is illustrated as a single component for purposes of clarity and explanation. Data repository 120 is implemented on various devices corresponding to entities 110, with each implementation possibly storing different subsets of the data components illustrated in data repository 120.

Data repository 120 may include multiple different storage units and/or devices. The multiple different storage units and/or devices may or may not be of the same type or located at the same physical site. Further, data repository 120 may be or may execute on the same computing system as key generator 102, ad verifier 104, and/or hardware and/or software managed by entities 110. Alternatively or additionally, data repository 120 may be on a separate computing system than key generator 102, ad verifier 104, and/or hardware and/or software managed by entities 110. Data repository 120 may be connected to key generator 102, ad verifier 104, and/or hardware and/or software managed by entities 110 via a direct connection or via a network.

Ad request 122, private key 124, public key 126, signature generation algorithm 128, signature verification algorithm 130, signature 132, and verification message 134 are illustrated within data repository 120 for purposes of clarity and explanation. However, ad request 122, private key 124, public key 126, signature generation algorithm 128, signature verification algorithm 130, signature 132 and verification message 134 may be stored in different data repositories in some embodiments. Key generator 102, ad verifier 104, and/or each of entities 110 may have its own data repository. Alternatively, one or more data repositories may be accessible and shared amongst key generator 102, ad verifier 104, and/or entities 110.

In one or more embodiments, ad request 122 is a collection of information pertaining to an ad impression generated by publisher 112. As described above, an ad impression is a placement of an advertisement at an ad space on each loading of a particular web content. Web content may include a webpage loaded at a web browser, an application loaded at a smartphone, an application loaded at a television, or any other content that is available through the World Wide Web or the Internet. Ad space may be presented as a banner, a side column, a pop up window, an expanding window, a news feed, an audio stream, a video stream, or any other presentation provided by a piece of web content. Information included in ad request 122 may relate to the web content that is to display an ad impression, and/or an end user who initiates a loading of the web content.

In an embodiment, ad request 122 includes a Uniform Resource Locator (URL) of the web content that is to display an ad impression. In an example, an end user makes a request to load a webpage having the URL, www.cnn.com. This webpage includes an ad space, which initiates the generation of ad request 122. The URL, www.cnn.com, is included in ad request 122.

In an embodiment, ad request 122 includes attributes of an end user making a request to load web content. Attributes of an end user may include the age, gender, and location of the end user. Attributes of an end user may also include web cookies, which may be used to determine a web surfing history of the end user. In an example, an end user browses web content relating to online shopping. An end user browses a first product on a first webpage, and then browses a second product on a second webpage. Information pertaining to the end user's browsing of the first product and the second product is included in ad request 122.

In an embodiment, ad request 122 includes a type of content associated with the web content that is to display an ad impression. Types of content include news, social media, blogs, games, photo/video sharing sites, and applications. The type of content associated with the web content that is to display an ad impression may be embedded in the source code of the web content.

In an embodiment, ad request 122 includes a timestamp and a nonce. A timestamp indicates a time at which an ad request is generated. A nonce is a random set of text, numbers, or characters. The longer the length of a nonce, the less the probability that two same nonces are generated for two different ad requests. The nonce may serve as a unique identifier of each ad request. The timestamp and the nonce may be used to verify that ad request 122 is not a replay. A replay refers to a repeated transmission of multiple ad requests corresponding to a same ad impression. The multiple ad requests cause the same ad impression to be sold multiple times. Even though multiple advertisers bid for the multiple ad requests, only one advertisement corresponding to one advertiser is being placed on the ad space.

In an embodiment, ad request 122 includes information about the ad space, such as its dimensions in pixels and its location on a piece of web content. If the ad space is a pop-up advertisement, a duration of the pop-up may be included in ad request 122. Ad request 122 may also include information regarding whether the ad space is configured for presenting a still image, an animated image, a video, and/or an audio track.

In an embodiment, ad request 122 stores information in a particular format or structure. The format or structure of ad request 122 may be commonly used across entities 110. In an example, the format or structure of ad request 122 conforms to an industry standard, such as OpenRTB. Compliance with an industry standard facilitates the communication of ad request 122 across multiple entities 110.

Various types of ad requests may be used in accordance with one or more embodiments. In an embodiment, a type of ad request 122 is a signed ad request. A signed ad request is an ad request that includes signature 132. Generation of a signed ad request is described below with reference to FIG. 2. In an embodiment, a type of ad request 122 is a verified ad request. A verified ad request is an ad request that has been verified by ad verifier 104. Forwarding of a verified ad request is described below with reference to FIGS. 3 and 4, and Operations 318 and 416, in particular.

In one or more embodiments, signature 132 includes a set of text, numbers, or other characters, generated based on ad request 122. Different signatures may correspond to different ad requests. In an example, a particular signature 132 is generated based on ad request 122. Modifications to ad request 122 are made. Then a different signature 132 is generated based on the modified ad request 122. In another example, ad request 122 is modified due to fraud. Then the signature corresponding to the original ad request 122 will not correspond to the modified ad request 122. Signature 132 corresponding to a particular ad request 122 may be used to verify that the contents of ad request 122 have not been modified since signature 132 was generated. As described above, after signature 132 is generated, signature 132 may be included in ad request 122 to form a signed ad request.

In one or more embodiments, signature 132 is generated by applying private key 124 to signature generation algorithm 128. Generation of signature 132 is described below with reference to FIG. 2. An entity generating signature 132 may be referred to herein as a signer. An example of a signer is publisher 112.

In one or more embodiments, signature 132 is verified by either applying private key 124 to signature generation algorithm 128, or applying public key 126 to signature verification algorithm 130. Verification of signature 132 through the use of private key 124 is referred to herein as verification using symmetric keys. Verification using symmetric keys is described below with reference to FIG. 3. Verification of signature 132 through the use of public key 126 is referred to herein as verification using asymmetric keys. Verification using asymmetric keys is described below with reference to FIG. 4.

In one or more embodiments, private key 124 includes a set of text, numbers, or other characters, used to generate signature 132 corresponding to ad request 122. In some embodiments, private key 124 is also used to verify signature 132 corresponding to ad request 122. Each private key 124 is associated with an owner, such as publisher 112. An ad request 122 that includes a signature 132 generated using a particular private key 124 indicates that the ad request 122 was generated and/or transmitted by the owner of the particular private key 124. Different private keys are used by different publishers to sign ad requests. A particular private key 124, applied to a particular ad request 122, corresponds to a particular signature 132. An entity without the particular private key 124 is not able to generate the particular signature 132 on the same particular ad request 122. However, any entity with the particular private key 124 is able to generate the particular signature 132. If an unauthorized entity gains access to the particular private key 124, then the unauthorized entity may forge the signature 132 of the owner of the particular private key 124.

In one or more embodiments, public key 126 includes a set of text, numbers, or other characters, used to verify signature 132 corresponding to ad request 122. Each public key 126 is associated with a particular private key 124. Public key 126 is different from its associated private key 124. Each pair of private and public keys is associated with an owner, such as publisher 112. A public key 126 associated with a particular publisher 112 may be used to verify signature 132 if signature 132 was generated using a private key 124 associated with the particular publisher 112. While public key 126 may be used to verify signature 132, public key 126 cannot be used to generate signature 132.

In one or more embodiments, signature generation algorithm 128 is an algorithm used to generate signature 132. Signature generation algorithm 128 is deterministic, meaning a same signature 132 is generated every time a particular signature generation algorithm 128 is executed using a particular ad request 122 and a particular private key 124.

Signature generation algorithm 128 may be applied for either a verification process using symmetric keys or a verification process using asymmetric keys. Using symmetric keys, examples of signature generation algorithms include any cryptographic hash functions in the SHA-1 or SHA-2 family, such as SHA-256. Additional examples include DES, MurmurHash, and/or Fowler-Noll-Vo (such as, FNV-1 and FNV-1a). Using asymmetric keys, examples of signature generation algorithms include Rivest-Shamir-Adleman (RSA), Ed25519, Edwards-curve Digital Signature Algorithm (EdDSA), Elliptic Curve Cryptography (ECC), and other types of public key cryptography.

In one or more embodiments, signature verification algorithm 130 is an algorithm used to verify signature 132 corresponding to ad request 122, in a verification process using asymmetric keys. Signature verification algorithm 130 is executed using ad request 122, signature 132, and public key 126, to determine whether signature 132 matches ad request 122. Each signature verification algorithm 130 corresponds to a particular signature generation algorithm 128. If signature 132 is generated using a particular signature generation algorithm 128, then a corresponding signature verification algorithm 130 is executed to verify signature 132. For example, a signature verification algorithm 130 in accordance with RSA cryptography is executed in order to verify a signature 132 that was generated using a signature generation algorithm 128 in accordance with RSA cryptography.

In one or more embodiments, verification message 134 includes a confirmation, acknowledgement, or other message notifying a recipient that ad request 122 has been verified. In an example, a receipt of verification message 134 indicates that ad request 122 is verified. A lack of a receipt of verification message 134, or a receipt of an error message, indicates that ad request 122 is not verified. In another embodiment, a verified ad request is transmitted in lieu of or in addition to verification message 134.

In one or more embodiments, entities 110 include entities involved in real-time transactions for the sale of ad impressions, such as a publisher 112, a Supply Side Platform (SSP) 114, an ad exchange 116, a Demand Side Platform (DSP) 118, and an advertiser 119. Ad request 122 is forwarded from publisher 112 to advertiser 119, through one or more intermediaries such as SSP 114, ad exchange 116, DSP 118, or other entities not shown. Entities 110 illustrated in FIG. 1 may be involved in real-time transactions for the sale of ad impressions in any sequence. Any of entities 110 may be involved more than once in a single transaction. In an example, two different ad exchanges are involved in a transaction. SSP 114 transmits ad request 122 to a first ad exchange, which transmits ad request 122 to a second ad exchange, which transmits ad request 122 to DSP 118. An entity that is to receive an ad request 122 forwarded by a particular entity is referred to herein as a downstream entity from the perspective of the particular entity. An entity that forwarded an ad request 122 that is, or is to be, received by a particular entity is referred to herein as an upstream entity from the perspective of the particular entity.

In one or more embodiments, entities 110 manage hardware and/or software implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a database server, an ad server, a network policy server, a mainframe, a television, a content receiver, a set-top box, a video gaming console, a printer, a mobile handset, a smartphone, and a personal digital assistant ("PDA").

In one or more embodiments, publisher 112 manages hardware and/or software that publishes web content including ad space for displaying advertisements. The hardware and/or software associated with publisher 112 and used to deliver and/or manage advertisements is referred to herein as a publisher ad server.

In an example, publisher 112 manages hardware and/or software that generates ad request 122. Publisher 112 also manages hardware and/or software that collects information to be included in ad request 122, such as information pertaining to the ad impression, the web content that is to display the ad impression, and/or the end user initiating the loading of the web content.

In an example, publisher 112 manages hardware and/or software configured to perform operations described herein for generating a signed ad request. Publisher 112 generates signature 132 using private key 124 and signature generation algorithm 128. An example set of operations for generating a signed ad request is described below with reference to FIG. 2.

In one or more embodiments, Supply Side Platform (SSP) 114 manages hardware and/or software configured to facilitate the sale of an ad impression by publisher 112. In an example, SSP 114 facilitates the transmission of ad request 122 from publisher 112 to multiple ad exchanges 116 and/or other entities. SSP 114 may also offer tools for better management of the sale of ad impressions by publisher 112, such as setting minimum bid requirements to be respected by advertiser 119.

In one or more embodiments, ad exchange 116 manages hardware and/or software configured to provide a virtual marketplace for the sale of ad impressions through auctioning. The auctioning may be conducted through real-time bidding (RTB). Ad exchange 116 receives ad requests for ad impressions from one or more publishers. Ad exchange 116 receives bids for ad impressions from one or more advertisers. Ad exchange 116 determines a winning bidder, whose advertisement is then displayed on the web content.

In one or more embodiments, Demand Side Platform (DSP) 118 manages hardware and/or software configured to facilitate the purchase of ad impressions by advertiser 119. In an example, DSP 118 facilitates the bidding on ad requests from multiple ad exchanges 116 and/or other entities by advertiser 119.

In an example, DSP 118 programmatically determines a bid price for a particular ad impression based on bidding parameters set by advertiser 119. Bidding parameters may be based on criteria, such as, the type of web content corresponding to an ad request, and/or attributes of an end user corresponding to an ad request. Bidding parameters may also include a minimum or maximum bid price. DSP 118 then places a bid or makes a purchase of an impression at ad exchange 116 and/or another entity. DSP 118 may also provide tools for better management of the purchase of ad impressions by advertiser 119, such as monitoring the performance of ad campaigns.

In one or more embodiments, advertiser 119 manages hardware and/or software that creates, delivers, and/or manages an advertisement for displaying on a webpage. The hardware and/or software associated with advertiser 119 and used to manage advertisements is referred to herein as an advertiser ad server.

In an embodiment, advertiser 119 sets bidding parameters, to be used by DSP 118 when placing bids for ad impressions. Advertiser 119 may set bidding parameters based on which ad impressions advertiser 119 believes to provide more effective advertising. In an example, advertiser 119 desires to place an ad for a mobile game targeted at teenagers. One bidding parameter of advertiser 119 checks whether an end user corresponding an ad request is between the ages of 25 and 35. A bid price is set such that the bid price is higher for ad requests corresponding to an end user who is between the ages of 25 and 35, than for ad requests not corresponding to an end user who is between the ages of 25 and 35.

In one or more embodiments, additional intermediary entities (not shown) may be involved in real-time transactions for the sale of ad impressions. In an example, an ad network manages hardware and/or software that aggregates advertising inventory from one or more publishers, segments the advertising inventory into bundles, and sells ad impressions in bundles to one or more advertisers. Segmentation into bundles may be performed based on one or more criteria, such as, type of web content corresponding to an ad request, and/or attributes of an end user corresponding to an ad request. An ad network may or may not sell ad impressions through auctioning. In another example, a private exchange manages hardware and/or software that functions similarly to ad exchange 116, except only authorized advertisers are permitted to place bids in the private exchange.

In one or more embodiments, key generator 102 refers to hardware and/or software configured to generate and maintain private key 124 and/or public key 126. In an example of verification using symmetric keys, key generator 102 generates multiple private keys, each corresponding to a different publisher. Key generator 102 also maintains private keys by storing a mapping of each private key to the corresponding publisher 112. Key generator 102 may periodically generate a new private key for each publisher 112. When a new private key for a particular publisher 112 is generated, the old private key for the particular publisher 112 becomes invalid.

In an example of verification using asymmetric keys, key generator 102 generates multiple pairs of private and public keys. Each pair of private and public keys corresponds to a different publisher. Key generator 102 also maintains the pairs of private and public keys by storing a mapping of each pair of private and public keys to the corresponding publisher 112. Key generator 102 may periodically generate a new pair of private and public keys for each publisher 112. When a new pair of private and public keys for a particular publisher 112 is generated, the old pair of private and public keys for the particular publisher 112 becomes invalid. The frequency with which a new private key is obtained may be higher in a verification system using asymmetric keys than in a verification system using symmetric keys.

Key generator 102 may or may not be implemented as part of hardware and/or software managed by one of entities 110. In an example, key generator 102 is implemented as part of hardware and/or software managed by a signer of signature 132, such as publisher 112. In another example, key generator 102 is implemented as part of hardware and/or software managed by an entity requesting verification, such as SSP 114, ad exchange 116, DSP 118, or advertiser 119. In another example, key generator 102 is implemented as part of hardware and/or software managed by a third party, who is not one of entities 110 involved in real-time transactions for the sale of ad impressions. The third party may be a neutral arbitrator whose functions includes generating private key 124 and/or public key 126. The third party's functions may also include verifying signed ad requests. The third party may be a trusted third party (TTP), which, in cryptography, is an entity that is known to be a trustworthy source to one or more entities 110 that generates signature 132 or verifies signature 132.

In one or more embodiments, ad verifier 104 refers to hardware and/or software configured to perform operations described herein for verifying a signed ad request. Verification using symmetric keys or verification using asymmetric keys may be performed. Examples of operations performed by ad verifier 104 are described below with reference to FIGS. 3 and 4.

Ad verifier 104 may or may not be implemented as part of hardware and/or software managed by one of entities 110. Ad verifier 104 may or may not be managed by a same entity that manages key generator 102. An entity that manages ad verifier 104 is referred to herein as a verifier.

In an embodiment, ad verifier 104 is implemented as part of hardware and/or software managed by one of the entities 110 involved in real-time transactions for the sale of ad impressions, such as SSP 114, ad exchange 116, DSP 118, or advertiser 119.

In another embodiment, ad verifier 104 is implemented as part of hardware and/or software managed by a third party, who is not one of the entities 110 involved in real-time transactions for the sale of ad impressions. The third party may be a neutral arbitrator, or a trusted third party. One or more entities 110 may submit a verification request to the third party.

In one example, in-band verification refers to verification by an entity that is on the path of an ad request from a publisher to an advertiser. If the verification is successfully completed, the ad request is forwarded. In another example, out-of-band verification refers to verification by an entity that specifically receives a request to verify an ad request. A downstream entity, such as a DSP entity may receive an ad request and request verification from a SSP entity. The SSP entity may verify the ad request and inform the DSP entity whether the verification was successful.

In an embodiment, ad verifier 104 may be local to or remote from hardware and/or software managed by entities 110. Ad verifier 104 may implement an application programming interface (API), through which entities 110 may submit verification requests. Alternatively or additionally, ad verifier 104 may be implemented in a "black box device," such that the operations, functionality, and/or data used by ad verifier 104 to verify signature 132 is not known to entities 110. The "black box device" may be implemented on a device separate from the hardware and/or software managed by entities 110, but may be local to the hardware and/or software managed by entities 110.

C. Generate a Signed Ad Request

Figure 2:
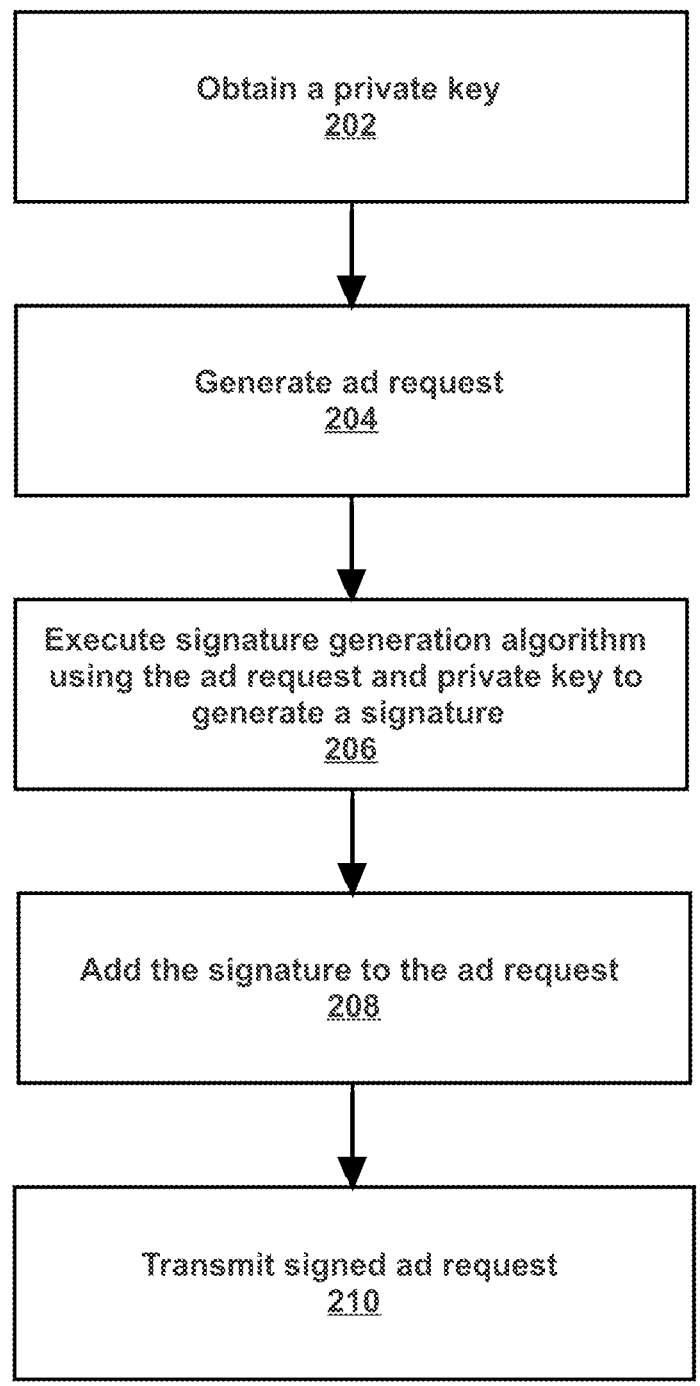
FIG. 2 shows an example set of operations for generating a signed ad request in accordance with one or more embodiments.

FIG. 2 illustrates an example set of operations for generating a signed ad request in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. Operations illustrated in FIG. 2 are performed by hardware and/or software managed by a signer of a signature, such as a publisher of web content that includes ad space.

Initially, a private key is obtained, in accordance with one or more embodiments (Operation 202). A private key may be obtained by generating the private key, or by receiving the private key from another entity. In an example, a private key may be generated based on a random number outputted by a random number generator or pseudorandom number generator. The random number may also be a prime number. In a RSA cryptosystem, for example, two random prime numbers, p and q, are selected. The numbers p and q are multiplied to output a product n. A private key d is generated based on p, q, and n.

In another example, a private key is received from another entity that generated the private key. The entity that generated the private key may be an entity that is involved in real-time transactions for the sale of ad impressions, such as a SSP, ad exchange, DSP, or advertiser. Alternatively, the entity that generated the private key may be a third party, such as a neutral arbitrator or a trusted third party. A private key may be received through a portable storage device. In an example, a private key is locally copied from the entity that generated the private key onto a portable storage device. The portable storage device is physically transported to a device of the signer. Then the private key is locally copied from the portable storage device to the device of the signer. The portable storage device may be, for example, a Universal Serial Bus (USB) flash drive, a laptop, or a portable hard drive. Alternatively, the private key may be received over a network. In an example, the private key is received through a secure communications channel over the Internet, such as Secure Shell (SSH), Hypertext Transport Protocol Secure (HTTPS), Secure Sockets Layer (SSL), and File Transfer Protocol Secure (FTPS). In another example, the private key may be received through a private network, a virtual private network (VPN), a Bluetooth connection, or a cable connection.

In an example, a new private key is periodically obtained. When a new private key is obtained, the old private key may become invalid and may be discarded. Alternatively, when a new private key is obtained, both the new private key and the old private key may co-exist for a short period of time, in order to validate in-flight requests. Once this period of time has passed, the old private key may become invalid and may be discarded.

In one or more embodiments, an ad request is generated (Operation 204). An ad request is generated in response to a loading of web content that includes an ad space. A code snippet, such as HTML or JavaScript code, within a source code for the web content indicates that an ad space is available. When the source code for the web content is being loaded, the code snippet initiates a generation of an ad request. The code snippet also indicates an address to which the ad request is to be directed. This address may be associated with a publisher ad server, a SSP, an ad exchange, or another entity involved in real-time transactions for the sale of ad impressions.

In one or more embodiments, information pertaining to the ad impression is included in an ad request. This information may be obtained from a publisher ad server and/or another server. In an example, meta-data pertaining to a particular piece of web content is stored at a server of a publisher. The meta-data indicates a URL of the web content. The meta-data also indicates a type of content displayed by the web content, such as news, a blog, an image, or a video. This information is extracted from the meta-data and included in an ad request.

In another example, web surfing histories are stored at a server of a publisher. Each time a publisher server receives a request to load web content from an end user, the server stores, into a log file, a cookie enclosed in the request as well as a time of the request. By analyzing this log file, the server identifies which pieces of web content the end user has visited, in what sequence, and for how long. Web surfing histories may also be tracked through the use of Internet Protocol (IP) addresses, or the referrer field of headers of Hypertext Transport Protocol (HTTP) requests. A cookie, and/or information regarding an end user's web surfing history, is included in an ad request.

In another example, user identifiers and associated demographic or other end user information is stored in a database at a server of a publisher. When an end user makes a request to load web content while logged in using a user identifier, the user identifier is enclosed in the request. The user identifier is used to determine demographic information corresponding to the end user. The user identifier, and/or the demographic information, is included in an ad request.

In one or more embodiments, a timestamp and nonce are optionally included in an ad request. A timestamp, indicating a time at which an ad request is generated, may be determined based on a clock on an ad server or other server of the publisher. A nonce may be generated using a random number generator or a pseudo random number generator.

In one or more embodiments, information is compiled into an ad request in a particular format or structure. In an example, the ad request complies with an industry standard, such as OpenRTB.

In one or more embodiments, a signature generation algorithm is executed using a private key and an ad request to generate a signature (Operation 206). A signature generation algorithm is a function that takes the private key and the ad request as input. The signature generation algorithm performs one or more operations on the private key and the ad request to generate a signature. Using RSA, for example, a signature generation algorithm involves applying a cryptographic hash function to an ad request to generate a hash value. The signature generation algorithm then performs various operations on the hash value, based on a private key, d. The signature generation algorithm then outputs a signature corresponding to the ad request.

In one or more embodiments, a signature generation algorithm may be applied to all or a portion of an ad request. Signature generation algorithm may be applied to all or some of the following information included in an ad request, including but not limited to: the URL, the type of web content that is to display the advertisement, a user identifier, demographic information of an end user, and/or web surfing history of the end user.

In one or more embodiments, a signature is added to an ad request (Operation 208). The signature may be appended to an end of an ad request. The signature may alternatively be included in a header of an ad request. With the inclusion of the signature, the ad request becomes a signed ad request.

In one or more embodiments, a signed ad request is transmitted (Operation 210). As the source code for a piece of web content including an ad space is loading, a code snippet within the source code causes the signed ad request to be transmitted to a publisher ad server, SSP, ad exchange, or other entity involved in real-time transactions for the sale of ad impressions. The ad request may be transmitted via the Internet using HTTP or HTTPS. The transmission of an ad request may initiate a real-time bidding (RTB) for the ad impression.

D. Verify a Signed Ad Request Using Symmetric Keys

Figure 3:
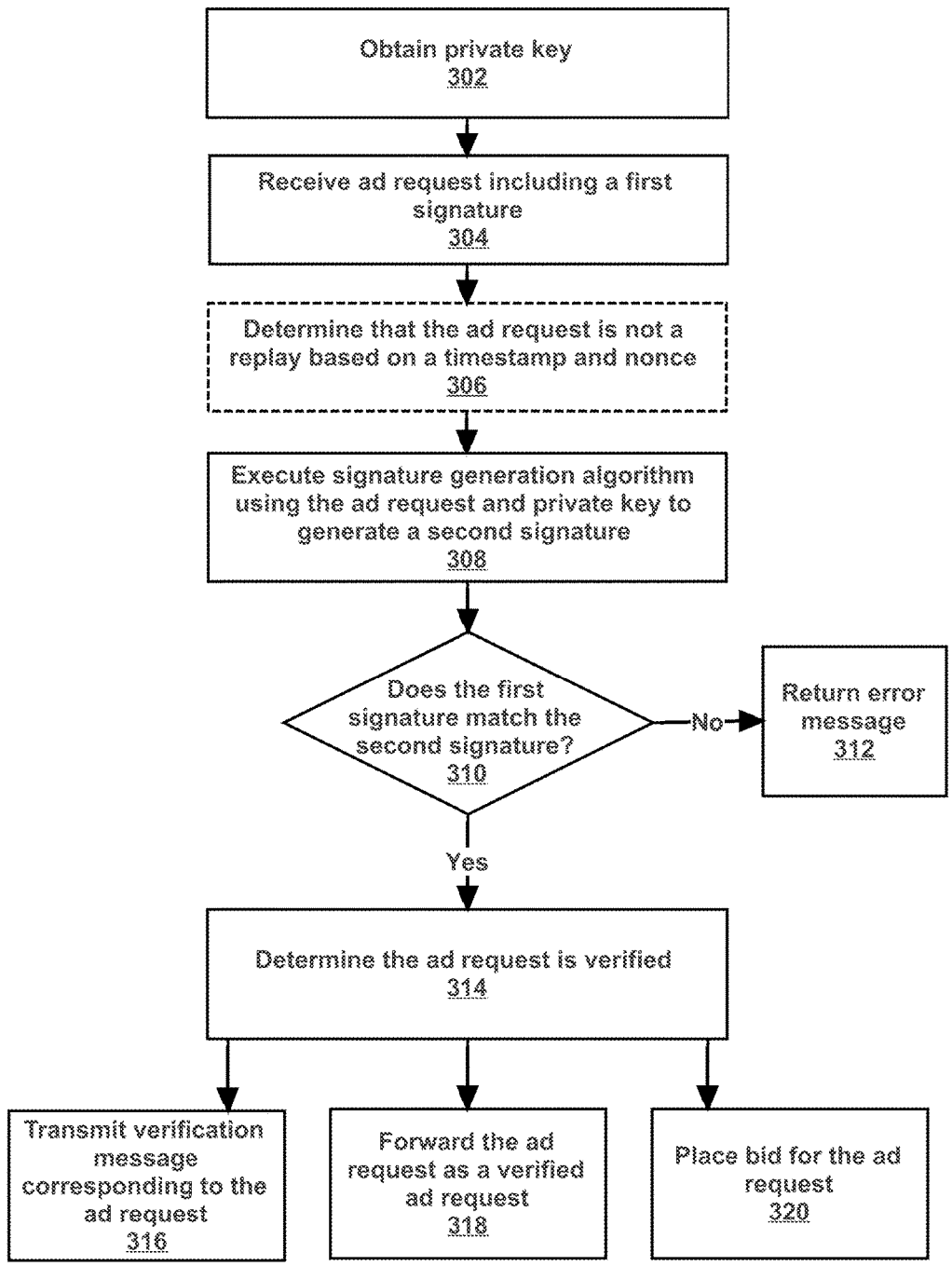
FIG. 3 shows an example set of operations for verifying a signed ad request using symmetric keys in accordance with one or more embodiments.

An ad request may be signed using operations as described above with reference to FIG. 2. A signed ad request may be verified using symmetric keys. FIG. 3 shows an example set of operations for verifying a signed ad request using symmetric keys in accordance with one or more embodiments. An entity performing a verification in accordance with FIG. 3 is herein referred to as a verifier.

In an embodiment, verification is performed by an entity involved in real-time transactions for the sale of ad impressions. The signed ad request is received by such an entity as part of its routine processing of real-time transactions for the sale of ad impressions. Alternatively, verification is performed by a third party at the request of an entity involved in real-time transactions for the sale of ad impressions. The third party may be a neutral arbitrator or a trusted third party. The signed ad request is received by the third party as part of a verification request submitted by an entity involved in real-time transactions for the sale of ad impressions. Further description of examples of how an ad request is received, by either an entity involved in real-time transactions for the sale of ad impressions or a third party, is described below with reference to Operation 304 of FIG. 3.

Initially, a private key is obtained, in accordance with one or more embodiments (Operation 302). A private key may be obtained by generating the private key, or by receiving the private key. In an example, a private key is generated based on a random number outputted by a random number generator or pseudorandom number generator. The random number may also be a prime number. If the private key is generated by the verifier, then a copy of private key is distributed to a publisher who is to sign its ad requests using the private key. The publisher receives the copy of the private key in accordance with Operation 202 of FIG. 2. The same private key is held by the verifier and the publisher.

In another example, a private key is received from another entity that generated the private key. The entity that generated the private key may be a publisher, who is to sign its ad requests using the private key. The private key may be generated by the publisher in accordance with Operation 202 of FIG. 2. Alternatively, the entity that generated the private key may be a third party, which distributes the same private key to the verifier and the publisher. The private key may be received by the publisher in accordance with Operation 202 of FIG. 2. The same private key may also be received by the verifier using any of the communication methods described with reference to Operation 202 of FIG. 2, such as, using a portable storage device, a secure communication channel, or other network connection.

In an example, a private key is obtained and then stored in a database managed by the verifier. The database stores multiple private keys, each corresponding to a different publisher. Further, a new private key, for each publisher, is periodically obtained. When a new private key of a publisher is obtained, the old private key of the publisher may become invalid and may be discarded. Alternatively, when a new private key of a publisher is obtained, both the new private key and the old private key may co-exist for a short period of time, in order to validate in-flight requests. Once this period of time has passed, the old private key may become invalid and may be discarded.

In one or more embodiments, an ad request including a first signature is received (Operation 304). The signed ad request is received by the verifier, which may be an entity involved in real-time transactions for the sale of ad impressions or a third party.

In an example, a signed ad request is received by an entity involved in real-time transactions for the sale of ad impressions as part of its routine processing of such transactions. For example, as part of its operations to facilitate the sale of an ad impression, a SSP receives a signed ad request from a publisher, so that the SSP may forward the signed ad request to one or more ad exchanges for auctioning. As another example, as part of its operations to provide a virtual marketplace for ad impressions, an ad exchange receives a signed ad request from a SSP, so that the ad exchange may auction the signed ad request. As another example, as part of its operations to facilitate the purchase of an ad impression, a DSP receives a signed ad request from an ad exchange, so that the DSP may place bids on the signed request on behalf of one or more advertisers. As another example, as part of its operations to purchase an ad impression, an advertiser receives a signed ad request from a DSP, so that the advertiser may confirm, track, and/or manage a bid on the signed ad request. In a particular real-time transaction for the sale of an ad impression, a signed ad request received in accordance with Operation 304 may be the same as the signed ad request that was transmitted by a publisher in accordance with Operation 210 of FIG. 2.

In another example, a signed ad request is received by a third party, such as a neutral arbitrator or a trusted third party. When an entity involved in real-time transactions for the sale of ad impressions receives a signed ad request, the entity forwards the signed ad request along with a verification request to the third party. The third party receives the ad request forwarded by the entity involved in real-time transactions for the sale of ad impressions.

In an example where a signed request is received by a third party, the signed ad request is received via an application programming interface (API), such as a web API. An entity involved in real-time transactions for the sale of ad impressions submits a verification request along with the signed ad request by making a call or request to the API of the third party. The signed ad request is then received by the third party through the API.

In another example where a signed ad request is received by a third party, the signed ad request is received via a "black box device" implemented by the third party. The "black box device" may be local to the hardware and/or software managed by an entity involved in real-time transactions for the sale of ad impressions. An entity involved in real-time transactions for the sale of ad impressions submits a verification request along with the signed ad request by making a call or request to the "black box device." The signed ad request is then received by the third party through the "black box device."

In one or more embodiments, a received ad request is optionally determined not to be a replay based on a timestamp and a nonce (Operation 306). A timestamp and a nonce are identified in the received ad request. In an example, a timestamp included in an ad request is compared with a current time. The current time may be a time at which an ad request is received, which is determined based on a clock on a server of the verifier. If the timestamp is outside a particular time window from the time at which the ad request is received, then the ad request is outdated, and may be determined to be a replay. The particular time window may be set based on multiple criteria. One criteria may be the time that is expected to pass between the generation and the receipt of the ad request. Another criteria may be the margin of error that is permitted between the clock on the publisher's server and the clock on the verifier's server. In an example, a complete bidding process is expected to be performed within 100 ms. The time that is expected to pass between the generation and receipt of the ad request is at most 100 ms. Further, the verifier permits the clock on the publisher's server to be off from the clock on the verifier's server by 5 ms. If the verifier's clock shows 1433527939302 UTC millis (corresponding to 18:12:19 UTC), for example, the publisher's clock is expected to be within 5 ms of 1433527939302 UTC millis, which is between 1433527939297 UTC millis and 1433527939307 UTC millis. The particular time window is determined to be a sum of both criteria, which is 100+5=105 ms.

In an example, a nonce included in an ad request is compared with a set of nonces that were included in previously received ad requests and stored into a database by the verifier. As described above, a nonce may serve as a unique identifier of an ad request. If a nonce in the currently received ad requests matches one of the nonces in a previously received ad request, then it is likely that the currently received ad request is a repeat of the previously received ad request. In another example, a timestamp and a nonce included in an ad request is considered a pair. A pair of a timestamp and nonce of a currently received ad request is compared with pairs of timestamps and nonces of previously received ad requests. If there is a match, then the currently received ad request is determined to be a replay.

Each time a nonce is received, the nonce may be stored into a database by the verifier. The nonce may be stored for a time period that is equal to or greater than the particular time window that is used to determine whether the ad request is outdated. If the particular time window has passed, then a timestamp included in an ad request may be used to determine whether the ad request is a replay, or otherwise invalid, without the need to use the nonce included in the ad request. Nonces that relate to ad requests prior to the particular time window are no longer necessary and may be discarded from the verifier's database.

In one or more embodiments, a signature generation algorithm is executed using an ad request and a private key to generate a second signature (Operation 308). A signature generation algorithm is a function that takes the private key and the ad request as input. The signature generation algorithm performs one or more operations on the private key and the ad request to generate a signature. This signature generation algorithm may be identical to the signature generation algorithm used to generate the first signature, which may be in accordance with Operation 206 of FIG. 2.

The private key to be inputted into the signature generation algorithm may be selected from a candidate set of private keys stored by the verifier. Each of the candidate set of private keys may correspond to a different publisher. The candidate set of private keys may be stored with identifiers of corresponding publishers in a database managed by the verifier. In an example, an identifier of a particular publisher is included in an ad request. A verifier identifies the particular publisher by processing the information included in the ad request. The verifier selects the private key corresponding to the particular publisher, by matching the identifier of the particular publisher included in the ad request with an identifier of one of the publishers stored in the verifier's database.

In one or more embodiments, a signature generation algorithm may be applied to all or a portion of an ad request, depending on how the signature generation algorithm was applied by the signer. If the signer applied the signature generation algorithm to the entire ad request, then the verifier applies the signature generation algorithm to the entire ad request. If the signer applied the signature generation algorithm to the URL, or another portion of the ad request, then the verifier applies the signature generation algorithm to that portion of the ad request.

In one or more embodiments, it is determined whether the first signature matches the second signature (Operation 310). In an example, if each character of the first signature is the same as each character of the second signature, and the characters in the first and second signatures appear in the same sequence, then there is a match.

In one or more embodiments, if the first signature does not match the second signature, then an error message is returned (Operation 312). Alternatively, no error message is returned, and the ad request is simply dropped.

In one or more embodiments, if the first signature matches the second signature, then the ad request is determined to be verified (Operation 314). One or more actions may be performed responsive to determining that the ad request is verified. Examples of such actions are described below with respect to Operations 316, 318, and 320.

In one or more embodiments, the verification is being performed by a third party, such as a neutral arbitrator or a trusted third party. The trusted third party may refer to any entity (e.g., SSP entity) that is different than an entity requesting the verification (e.g., DSP entity). The ad request was received by the third party, in accordance with Operation 304, along with a verification request sent from an entity involved in real-time transactions for the sale of ad impressions. If the ad request is determined to be verified in accordance with Operation 314, a verification message corresponding to the ad request is transmitted (Operation 316). The verification message is transmitted to the entity that submitted the verification request. The verification message may include a code, text, or other characters, notifying the entity which submitted the verification request that the ad request is verified.

In one or more embodiments, the verification is being performed by an intermediary entity involved in real-time transactions for the sale of ad impressions, such as an SSP, ad exchange, or DSP. The ad request is verified prior to be forwarded. The ad request was received by the entity, in accordance with Operation 304, as part of its routine processing of real-time transactions for the sale of ad impressions. If the ad request is determined to be verified in accordance with Operation 314, the ad request is forwarded as a verified ad request (Operation 318). The verified ad request is forwarded to a downstream entity involved in real-time transactions for the sale of ad impressions.

In an example, the intermediary entity performing the verification is a SSP. As part of its routine processing of such transactions, after the SSP receives an ad request from a publisher, the SSP is configured to forward the ad request to one or more ad exchanges, in order to offer the ad impression corresponding to the ad request for auction. When the SSP receives a signed ad request, and determines the signed ad request to be verified, the SSP forwards the signed ad request as a verified ad request to the one or more ad exchanges.

A verified ad request may be formed in different ways. In an example, a verification message is appended to the ad request to form a verified ad request. In another example, a verified ad request is identical to the ad request, however, the downstream recipient of the verified ad request regards the verifier as a trusted party. Based on a trusted relationship between the downstream recipient and the verifier, any ad request forwarded by the verifier is considered to be a verified ad request by the downstream recipient. The trusted relationship may be based on a contractual relationship between the downstream recipient and the verifier. Alternatively the trusted relationship may be based on a brand name or good will of the verifier.

In one or more embodiments, the verification is being performed by an entity that places a bid, such as a DSP or an advertiser. The ad request was received by such an entity, in accordance with Operation 304, as part of its routine processing of real-time transactions for the sale of ad impressions. If the ad request is determined to be verified in accordance with Operation 314, a bid is placed on the ad request (Operation 320). The bid price may be determined based on setting and/or applying bidding parameters to information included in the ad request. In an example, a bidding parameter establishes that 1,000 ad impressions corresponding to end users between twenty and thirty years old are to be bought for $1.00. If an ad request is verified, information included in the ad request is compared to criteria set by the bidding parameter. If the ad request corresponds an end user between twenty and thirty years old, and less than 1,000 such ad impressions have been purchased, then a bid with a price of $1.00 is made for the ad request.

E. Verify a Signed Ad Request Using Asymmetric Keys

Figure 4:
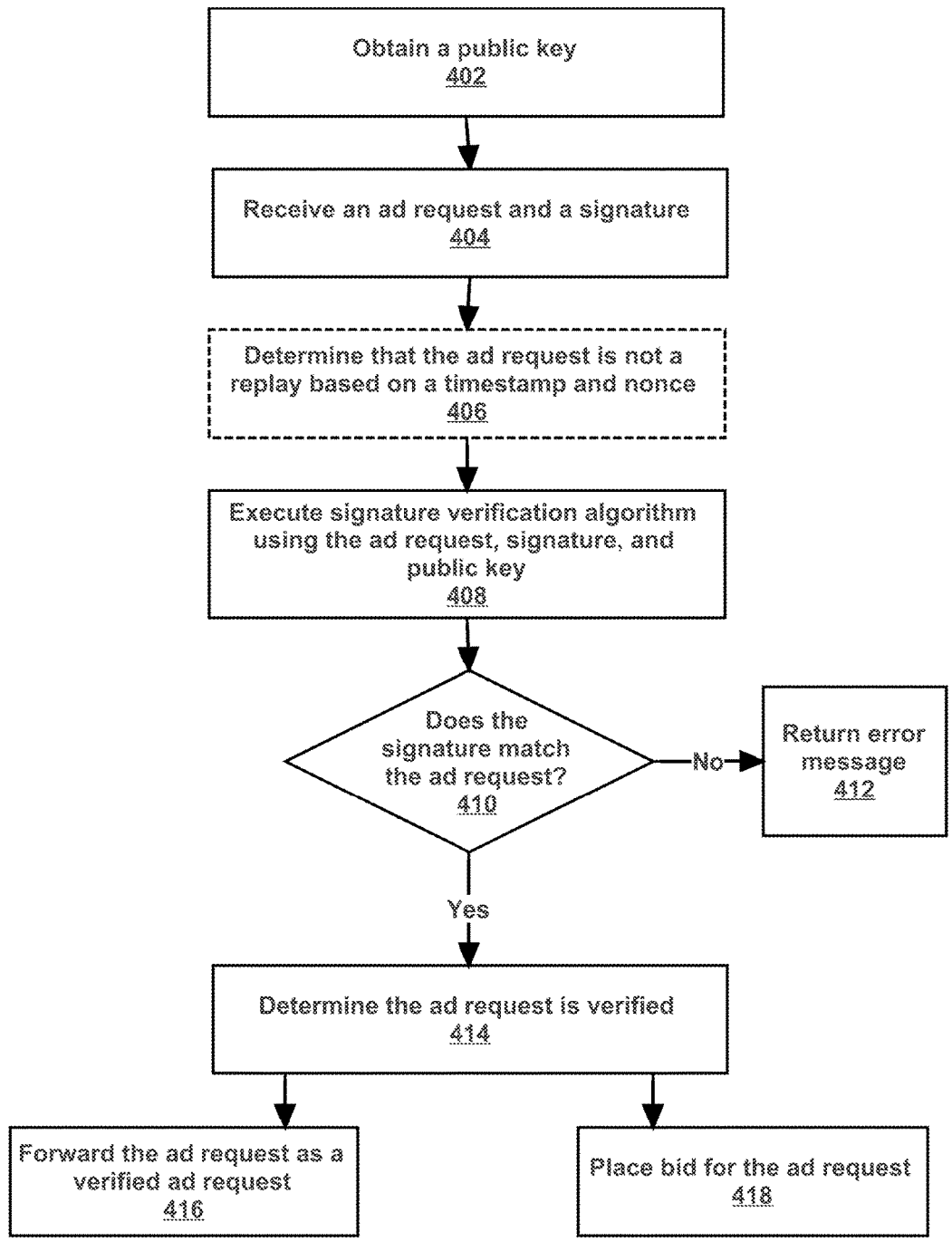
FIG. 4 shows an example set of operations for verifying a signed ad request using asymmetric keys in accordance with one or more embodiments.

An ad request may be signed using operations as described above with reference to FIG. 2. A signed ad request may be verified using asymmetric keys. FIG. 4 shows an example set of operations for verifying a signed ad request using asymmetric keys in accordance with one or more embodiments. An entity performing a verification in accordance with FIG. 4 is herein referred to as a verifier.

Initially, a public key is obtained, in accordance with one or more embodiments (Operation 402). A public key may be obtained by generating the public key, or receiving the public key. In an example, a public key may be generated based on a random number outputted by a random number generator or pseudorandom number generator. The random number may also be a prime number. In another example, a public key may be deterministically generated based on hashing a secret key and an ad request. In a RSA cryptosystem, for example, two random prime numbers, p and q, are selected. The numbers p and q are multiplied to output a product n. A public key e is generated based on p, q, and n. If the public key is generated by the verifier in accordance with Operation 402, then a corresponding private key is also generated by the verifier. A copy of the corresponding private key is distributed to a publisher who is to sign its ad requests using the private key. The publisher receives the corresponding private key in accordance with Operation 202 of FIG. 2.

In another example, a public key is received from another entity that generated the public key. The entity that generated the public key is also the entity that generates a corresponding private key. The entity generating the pair of private and public keys may be a publisher, who is to sign ad requests using the private key. Alternatively, the entity generating the pair of private and public keys may be a third party. The third party may distribute the private key to the publisher, and the public key to the verifier. The private key may be received by the publisher in accordance with Operation 202 of FIG. 2. The public key may be received by the verifier using any of the communication methods described with reference to Operation 202 of FIG. 2, such as, using a portable storage device, a secure communication channel, or other network connection. The public key may also be received by the verifier using a non-secure channel or network connection.

In an example, a public key is obtained and then stored in a database managed by the verifier. The database stores multiple public keys, each corresponding to a different publisher. Further, a new public key, for each publisher, is periodically obtained. When a new public key of a publisher is obtained, the old public key of the publisher may become invalid and may be discarded. Alternatively, when a new public key of a publisher is obtained, both the new public key and the old public key may co-exist for a short period of time, in order to validate in-flight requests. Once this period of time has passed, the old public key may become invalid and may be discarded.

In one or more embodiments, an ad request including a signature is received (Operation 404). In an example, a signed ad request is received by an entity involved in real-time transactions for the sale of ad impressions as part of its routine processing of an online advertising transaction. For example, as part of its operations to facilitate the sale of an ad impression, a SSP receives a signed ad request from a publisher, so that the SSP may forward the signed ad request to one or more ad exchanges for auctioning. As another example, as part of its operations to provide a virtual marketplace for ad impressions, an ad exchange receives a signed ad request from a SSP, so that the ad exchange may auction the signed ad request. As another example, as part of its operations to facilitate the purchase of an ad impression, a DSP receives a signed ad request from an ad exchange, so that the DSP may place bids on the signed request on behalf of one or more advertisers. As another example, as part of its operations to purchase an ad impression, an advertiser receives a signed ad request from a DSP, so that the advertiser may confirm, track, and/or manage a bid on the signed ad request. In a particular real-time transaction for the sale of an ad impression, a signed ad request received in accordance with Operation 404 may be the same as the signed ad request that was transmitted by a publisher in accordance with Operation 210 of FIG. 2.

In one or more embodiments, a received ad request is optionally determined not to be a replay based on a timestamp and a nonce (Operation 406). A timestamp and a nonce are identified in the received ad request. In an example, a timestamp is compared with a particular time window with respect to a time at which the ad request is received by the verifier. In another example, a nonce is compared with a set of nonces that were included in previously received ad requests and stored by the verifier. Some examples for determining whether an ad request is a replay based on a timestamp and a nonce are described with reference to Operation 306 of FIG. 3.

In one or more embodiments, a signature verification algorithm is executed using an ad request, a signature, and a public key to determine whether a signature matches the ad request (Operation 408). A signature verification algorithm is a function that takes the public key, the ad request, and the signature included in the ad request as input. The signature verification algorithm performs one or more operations on the public key, ad request, and signature to output a Boolean true or a Boolean false, indicating whether the signature matches the ad request. Operations performed by a signature verification algorithm may be different from operations performed by the signature generation algorithm used to generate the signature included in the ad request, in accordance with Operation 206 of FIG. 2. The signature verification algorithm and the signature generation algorithm may correspond to the same cryptographic system. For example, a RSA signature verification algorithm is applied a signature that was generated using a RSA signature generation algorithm.

The public key to be inputted into a signature verification algorithm may be selected from a candidate set of public keys stored by the verifier. Each of the candidate set of public keys may correspond to a different publisher. The candidate set of public keys may be stored with identifiers of corresponding publisher in a database managed by the verifier. In an example, an identifier of a particular publisher is included in an ad request. A verifier identifies the particular publisher by processing the information included in the ad request. The verifier selects the public key corresponding to the particular publisher, by matching the identifier of the particular publisher included in the ad request with an identifier of one of the publishers stored in the verifier's database.

In one or more embodiments, a signature verification algorithm may be applied to all or a portion of an ad request, depending on how the signature generation algorithm was applied by the signer. If the signer applied the signature generation algorithm to the entire ad request, then the verifier applies the signature verification algorithm to the entire ad request. If the signer applied the signature generation algorithm to the URL, or another portion of the ad request, then the verifier applies the signature verification algorithm to that portion of the ad request.

In one or more embodiments, it is determined whether a signature in an ad request matches the ad request (Operation 410). In an example, if an output of a signature verification algorithm is true, then the signature matches the ad request. If an output of a signature verification algorithm is false, then the signature does not match the ad request.

In one or more embodiments, if the signature does not match the ad request, then an error message is returned (Operation 412). Alternatively, no error message is returned, and the ad request is simply dropped.

In one or more embodiments, if the signature matches the ad request, then the ad request is determined to be verified (Operation 414). One or more actions may be performed responsive to determining that the ad request is verified. Examples of such actions are described below with respect to Operations 416 and 418.

In one or more embodiments, the verification is being performed by an intermediary entity involved in real-time transactions for the sale of ad impressions, such as an SSP, ad exchange, or DSP. The ad request was received by such an entity, in accordance with Operation 404, as part of its routine processing of real-time transactions for the sale of ad impressions. If the ad request is determined to be verified in accordance with Operation 414, the ad request is forwarded as a verified ad request (Operation 416). The verified ad request is forwarded to another entity involved in real-time transactions for the sale of ad impressions.

In an example, the verification is performed by a SSP. As part of its routine processing of real-time transactions for the sale of ad impressions, after the SSP receives an ad request from a publisher, the SSP is configured to forward the ad request to one or more ad exchanges, in order to offer the ad impression corresponding to the ad request for auction. When the SSP receives a signed ad request, and determines the signed ad request to be verified, the SSP forwards the signed ad request as a verified ad request to the one or more ad exchanges.

A verified ad request may be formed in different ways. In an example, a verification message is appended to the ad request to form a verified ad request. In another example, a verified ad request is identical to the ad request, however, the downstream recipient of the verified ad request regards the verifier as a trusted party. Based on a trusted relationship between the downstream recipient and the verifier, any ad request forwarded by the verifier is considered to be a verified ad request by the downstream recipient. The trusted relationship may be based on a contractual relationship between the downstream recipient and the verifier. Alternatively the trusted relationship may be based on a brand name or good will of the verifier.

In one or more embodiments, the verification is being performed by an entity that places a bid, such as a DSP or an advertiser. The ad request was received by such an entity, in accordance with Operation 404, as part of its routine processing of real-time transactions for the sale of ad impressions. If the ad request is determined to be verified in accordance with Operation 414, a bid is placed on the ad request (Operation 418). The bid price may be determined based on setting and/or applying bidding parameters to information included in the ad request. In an example, a bidding parameter establishes that 1,000 ad impressions corresponding to end users between twenty and thirty years old are to be bought for $1.00. If an ad request is verified, information included in the ad request is compared to criteria set by the bidding parameter. If the ad request corresponds an end user between twenty and thirty years old, and less than 1,000 such ad impressions have been purchased, then a bid with a price of $1.00 is made for the ad request.

F. Example Embodiment

Detailed examples are described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

In a first example, a signed ad request is generated. A publisher, Cable News Network (CNN), publishes a news website, www.cnn.com. A webpage of the website includes an ad banner. CNN receives a private key from a trusted third party. The private key was generated by the third party using a key generation algorithm.

An end user logs into www.cnn.com using a user identifier, "joe.smith." The end user makes a request to load the webpage including the ad banner at a browser. The request to load the webpage retrieves source code of the webpage, which includes a code snippet indicating the ad banner.

The publisher, CNN, determines that the user identifier, "joe.smith" refers to an end user who is a twenty-year-old male. CNN forms an ad request, conforming to the OpenRTB standard, including the demographic information of the end user and the URL of the webpage, www.cnn.com. CNN then executes a signature generation algorithm using the ad request and the private key to generate a signature. CNN appends the signature to the ad request to form a signed ad request. The browser of the end user forwards the signed ad request to a SSP, in order to offer the ad impression for real-time bidding.

In a second example, a signed ad request is verified using symmetric keys. A signed ad request may be generated by a publisher, CNN, as described in the first example above. The signed ad request is received by a SSP. The SSP submits a verification request along with the signed ad request to a trusted third party. The trusted third party is the same entity that generated the private key corresponding to the publisher and distributed the private key to the publisher. The trusted third party receives the signed ad request. The trusted third party executes a signature generation algorithm using the ad request and the private key to generate a signature. This signature is compared to the signature included in the signed ad request. The trusted third party determines that the two signatures match, and that the ad request is verified. The trusted third party then transmits a verification message corresponding to the ad request to the SSP.

In a third example, a signed ad request is verified using asymmetric keys. A signed ad request may be generated by a publisher, CNN, as described in the first example above. The signed ad request is received by a SSP. The SSP holds a public key corresponding to the publisher. The SSP had earlier received the public key from a trusted third party. The trusted third party is the same entity that generated the private key corresponding to the publisher and distributed the private key to the publisher. The SSP executes a signature verification algorithm using the ad request, the signature included in the ad request, and the public key to determine whether the signature matches the ad request. The SSP determines that the signature matches the ad request, and that the ad request is verified. The SSP then forwards the ad request as a verified ad request to an ad exchange. The ad exchange considers the received ad request as a verified ad request based on a trusted relationship with the SSP.

In a fourth example, a signed ad request is altered due to fraud, and the signed ad request fails a verification process using symmetric keys. A signed ad request may be generated by a publisher, CNN, as described in the first example above. Prior to the signed ad request being received by a SSP, a fraudulent intermediary changes the URL included in the ad request from www.cnn.com to news.google.com. Further the fraudulent intermediary changes the information related to the end user, such that the end user now appears to be a thirty-year old female. However, the fraudulent attacker does not have a copy of the private key, and is unable to generate a modified signature for the modified ad request.

The SSP receives the modified ad request with the original signature. The SSP forwards the modified ad request with the original signature to a trusted third party for verification. The trusted third party executes a signature generation algorithm, using the private key and the modified ad request. A modified signature is generated. The modified signature does not match the original signature. The trusted third party determines that the ad request is not verified and returns an error message to the SSP.

G. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

H. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
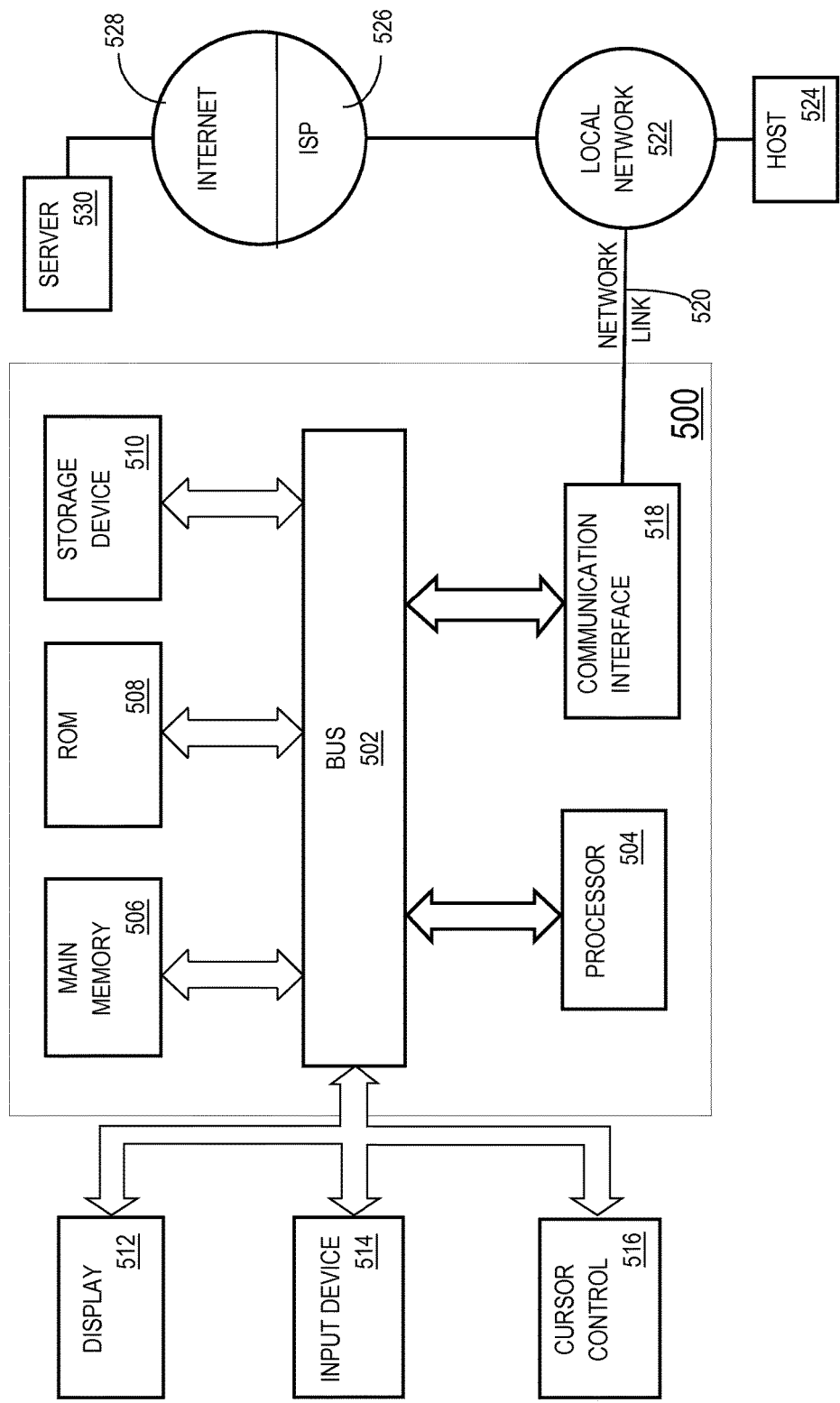
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, by an ad verifier from a first entity involved in real-time transactions for sale of ad impressions, a first ad request and a first digital signature, wherein the first ad request comprises a first request for a first advertisement to be placed on a first ad space within a first piece of web content, the first ad request is generated in response to a loading of the first piece of web content, a first set of code of the first piece of web content indicates a presence of the first ad space, and the first digital signature is generated using a first key associated with a first publisher of the first piece of web content;
determining that the first publisher is associated with the first ad request;
selecting the first key, from a plurality of keys, based on the first publisher;
executing a signature generation algorithm using the first ad request and the first key, selected from the plurality of keys, to generate a second digital signature;
determining if the first digital signature matches the second digital signature;
responsive to determining the first digital signature matches the second digital signature:
verifying that the first ad request is associated with the first publisher that is associated with the first key;
transmitting, by the ad verifier to a second entity involved in the real-time transactions for sale of ad impressions, a first verification message corresponding to the first ad request;
wherein transmitting the first verification message is further responsive to:
identifying a first nonce included in the first ad request, wherein the first nonce serves as a first unique identifier of the first ad request;
determining that the first nonce included in the first ad request does not match any nonce included in a first set of previously received ad requests;
determining that the first ad request is not a duplicate of any of the first set of previously received ad requests;
receiving, by the ad verifier from a third entity involved in the real-time transactions for sale of ad impressions, a second ad request and a third digital signature, wherein the second ad request comprises a second request for a second advertisement to be placed on a second ad space within a second piece of web content, the second ad request is generated in response to a loading of the second piece of web content, a second set of code of the second piece of web content indicates a presence of the second ad space, and the third digital signature is generated using a second key associated with a second publisher of the second piece of web content;
determining that the second publisher is associated with the second ad request;
selecting the second key, from the plurality of keys, based on the second publisher;
executing the signature generation algorithm using the second ad request and the second key, selected from the plurality of keys, to generate a fourth digital signature;
determining if the third digital signature matches the fourth digital signature;
responsive to determining the third signature matches the fourth signature:
verifying that the second ad request is associated with the second publisher that is associated with the second key;
transmitting, by the ad verifier to a fourth entity involved in the real-time transactions for sale of ad impressions, a second verification message corresponding to the second ad request;
wherein transmitting the second verification message is further responsive to:
identifying a second nonce included in the second ad request, wherein the second nonce serves as a second unique identifier of the second ad request;
determining that the second nonce included in the second ad request does not match any nonce included in a second set of previously received ad requests;
determining that the second ad request is not a duplicate of any of the second set of previously received ad requests;
wherein the method is executed by at least one device including a hardware processor.

2. The method of claim 1, wherein the first ad request comprises a Uniform Resource Locator (URL), and wherein executing the signature generation algorithm using the first ad request and the first key comprises applying the signature generation algorithm to the URL.

3. The method of claim 1, wherein the first ad request comprises a Uniform Resource Locator (URL), and wherein a modification of the URL within the first ad request results in a corresponding modification of any digital signature generated by executing the signature generation algorithm using the first ad request.

4. The method of claim 1, wherein the first ad request comprises a user identifier of a user that causes loading of the first piece of web content, and wherein a modification of the user identifier within the first ad request results in a corresponding modification of any digital signature generated by executing the signature generation algorithm using the first ad request.

5. The method of claim 1, wherein executing the signature generation algorithm using the first ad request comprises applying the signature generation algorithm to a first portion of the first ad request without applying the signature generation algorithm to a second portion of the first ad request.

6. The method of claim 1, wherein executing the signature generation algorithm using the first ad request comprises applying the signature generating algorithm to all portions of the first ad request.

7. The method of claim 1, wherein transmitting the first verification message is further responsive to:
   determining a timestamp included in the first ad request is within a particular time window from a current time.

8. The method of claim 1, wherein the first digital signature is generated by executing the signature generation algorithm that was used to generate the second digital signature.

9. A method comprising:
   receiving, by a particular entity involved in real-time transactions for sale of ad impressions, a first ad request and a first digital signature, wherein the first ad request comprises a first request for a first advertisement to be placed on a first ad space within a first piece of web content, the first ad request is generated in response to a loading of the first piece of web content, a first set of code of the first piece of web content indicates a presence of the first ad space, and the first digital signature is generated using a first key associated with a first publisher of the first piece of web content;
   determining that the first publisher is associated with the first ad request;
   selecting the first key, from a plurality of keys, based on the first publisher;
   executing a signature generation algorithm using the first ad request and the first key, selected from the plurality of keys, to generate a second digital signature;
   determining if the first digital signature matches the second digital signature;
   responsive to determining the first digital signature matches the second digital signature:
      verifying that the first ad request is associated with the first publisher that is associated with the first key;
      forwarding, by the particular entity, the first ad request as a first verified ad request to a first downstream entity involved in the real-time transactions for sale of ad impressions;
   wherein forwarding the first ad request as the first verified ad request is further responsive to:
      identifying a first nonce included in the first ad request, wherein the first nonce serves as a first unique identifier of the first ad request;
      determining that the first nonce included in the first ad request does not match any nonce included in a first set of previously received ad requests;
      determininq that the first ad request is not a duplicate of any of the first set of previously received ad requests;
   receiving, by the particular entity, a second ad request and a third digital signature, wherein the second ad request comprises a second request for a second advertisement to be placed on a second ad space within a second piece of web content, the second ad request is generated in response to a loading of the second piece of web content, a second set of code of the second piece of web content indicates a presence of the second ad space, and the third digital signature is generated using a second key associated with a second publisher of the second piece of web content;
   determining that the second publisher is associated with the second ad request;
   selecting the second key, from the plurality of keys, based on the second publisher;
   executing the signature generation algorithm using the second ad request and the second key, selected from the plurality of keys, to generate a fourth digital signature;
   determining if the third digital signature matches the fourth digital signature;
   responsive to determining the third digital signature matches the fourth digital signature:
      verifying that the second ad request is associated with the second publisher that is associated with the second key;
      forwarding, by the particular entity, the second ad request as a second verified ad request to a second downstream entity involved in the real-time transactions for sale of ad impressions;
   wherein forwarding the second ad request as the second verified ad request is further responsive to:
      identifying a second nonce included in the second ad request, wherein the second nonce serves as a second unique identifier of the second ad request;
      determining that the second nonce included in the second ad request does not match any nonce included in a second set of previously received ad requests;
      determining that the second ad request is not a duplicate of any of the second set of previously received ad requests;
   wherein the method is executed by at least one device including a hardware processor.

10. The method of claim 9, wherein the first ad request comprises a Uniform Resource Locator (URL), and wherein executing the signature generation algorithm using the first ad request and the first key comprises applying the signature generation algorithm to the URL.

11. A method, comprising:
   receiving, by a particular entity involved in real-time transactions for sale of ad impressions, a plurality of public keys, including a first public key and a second public key;
   receiving, by the particular entity, a first ad request and a first digital signature, wherein the first ad request comprises a first request for a first advertisement to be placed on a first ad space within a first piece of web content, the first ad request is generated in response to a loading of the first piece of web content, a first set of code of the first piece of web content indicates a presence of the first ad space, the first digital signature is generated using a first private key associated with a first publisher of the first piece of web content, and the first public key and the first private key are different;
   determining that the first publisher is associated with the first ad request;
   selecting the first public key, from the plurality of public keys, based on the first publisher;
   executing a signature verification method by applying the first public key to the first ad request and the first digital signature to determine if the first digital signature matches the first ad request;
   responsive to determining that the first digital signature matches the first ad request:

verifying that the first ad request is associated with the first publisher that is associated with both the first private key and the first public key;

forwarding, by the particular entity, the first ad request as a first verified ad request to a first downstream entity involved in the real-time transactions for sale of ad impressions;

wherein forwardinq the first ad request as the first verified ad request is further responsive to:

identifying a first nonce included in the first ad request, wherein the first nonce serves as a first unique identifier of the first ad request;

determining that the first nonce included in the first ad request does not match any nonce included in a first set of previously received ad requests;

determininq that the first ad request is not a duplicate of any of the first set of previously received ad requests;

receiving, by the particular entity, a second ad request and a second digital signature, wherein the second ad request comprises a second request for a second advertisement to be placed on a second ad space within a second piece of web content, the second ad request is generated in response to a loading of the second piece of web content, a second set of code of the second piece of web content indicates a presence of the second ad space, the second digital signature is generated using a second private key associated with a second publisher of the second piece of web content, and the second public key and the second private key are different;

determining that the second publisher is associated with the second ad request;

selecting the second public key, from the plurality of public keys, based on the second publisher;

executing the signature verification method by applying the second public key to the second ad request and the second digital signature to determine if the second digital signature matches the second ad request;

responsive to determining that the second signature matches the second ad request:

verifying that the second ad request is associated with the second publisher that is associated with both the second private key and the second public key;

forwarding, by the particular entity, the second ad request as a second verified ad request to a second downstream entity involved in the real-time transactions for sale of ad impressions;

wherein forwardinq the second ad request as the second verified ad request is further responsive to:

identifying a second nonce included in the second ad request, wherein the second nonce serves as a second unique identifier of the second ad request;

determining that the second nonce included in the second ad request does not match any nonce included in a second set of previously received ad requests;

determining that the second ad request is not a duplicate of any of the second set of previously received ad requests;

wherein the method is executed by at least one device including a hardware processor.

12. The method of claim 11, wherein the first digital signature is generated by executing a signature generation algorithm using the first private key, and the signature generation algorithm and signature verification method are different.

13. The method of claim 11, further comprising:
determining a timestamp included in the first ad request is within a particular time window from a current time;
determining that the first ad request is verified.

14. The method of claim 9, wherein executing the signature generation algorithm using the first ad request and the first key is performed by a particular device executing one or more software modules associated with a Supply Side Platform (SSP).

15. The method of claim 9, wherein executing the signature generation algorithm using the first ad request and the first key is performed by a particular device executing one or more software modules associated with an ad exchange.

16. The method of claim 9, wherein executing the signature generation algorithm using the first ad request and the first key is performed by a particular device executing one or more software modules associated with a Demand Side Platform (DSP).

17. The method of claim 11, wherein executing the signature verification method by applying the first public key to the first ad request and the first digital signature to determine if the first digital signature matches the first ad request is performed by a particular device executing one or more software modules associated with a Supply Side Platform (SSP).

18. The method of claim 11, wherein executing the signature verification method by applying the first public key to the first ad request and the first digital signature to determine if the first digital signature matches the first ad request is performed by a particular device executing one or more software modules associated with an ad exchange.

19. The method of claim 11, wherein executing the signature verification method by applying the first public key to the first ad request and the first digital signature to determine if the first digital signature matches the first ad request is performed by a particular device executing one or more software modules associated with a Demand Side Platform (DSP).

20. The method of claim 11, wherein the first ad request comprises a Uniform Resource Locator (URL), and wherein executing the signature verification method by applying the first public key to the first ad request and the first digital signature to determine if the first digital signature matches the first ad request comprises applying the signature verification method to the URL.

* * * * *